United States Patent [19]

Ernst et al.

[11] Patent Number: 4,563,314

[45] Date of Patent: Jan. 7, 1986

[54] APPARATUS FOR COOLING COOLING WATER

[75] Inventors: Günter Ernst, Strasse des Roten Kreuzes, D-7500 Karlsruhe 41; Dieter Wurz, Pfinztal-Söllingen, both of Fed. Rep. of Germany

[73] Assignee: Günter Ernst, Fed. Rep. of Germany

[21] Appl. No.: 715,466

[22] Filed: Mar. 25, 1985

Related U.S. Application Data

[63] Continuation of Ser. No. 216,496, Dec. 15, 1980, abandoned.

[30] Foreign Application Priority Data

Dec. 17, 1979 [DE] Fed. Rep. of Germany ....... 2950803

[51] Int. Cl.$^4$ .............................................. B01F 3/04
[52] U.S. Cl. ..................................... 261/153; 165/166; 261/DIG. 11; 261/DIG. 77; 261/112; 261/109
[58] Field of Search ....... 261/112, 110, 161, DIG. 11, 261/DIG. 77, 153; 165/DIG. 1, 166

[56] References Cited

U.S. PATENT DOCUMENTS

| | | | |
|---|---|---|---|
| 2,661,197 | 12/1953 | Norman | 261/112 |
| 3,151,675 | 10/1964 | Lysholm | 261/112 |
| 3,286,999 | 11/1966 | Takeda | 261/112 |
| 3,313,533 | 4/1967 | Powers | 261/112 |
| 3,374,992 | 3/1968 | Greer | 261/112 |
| 3,415,502 | 12/1968 | Munters | 261/DIG. 11 |
| 3,733,063 | 5/1973 | Loetel et al. | 261/112 |
| 3,952,077 | 4/1976 | Wigley | 261/112 |
| 3,963,810 | 6/1976 | Holmberg et al. | 261/112 |
| 3,995,689 | 12/1976 | Cates | 261/153 |
| 3,997,635 | 12/1976 | Hallgren | 261/161 |
| 4,002,040 | 1/1977 | Munters | 261/153 |
| 4,180,129 | 12/1979 | Sumitomo | 165/166 |
| 4,202,847 | 5/1980 | Ernst et al. | 261/161 |
| 4,269,796 | 5/1981 | Glicksman et al. | 261/112 |
| 4,337,216 | 6/1982 | Korsell | 261/DIG. 11 |

FOREIGN PATENT DOCUMENTS

| | | | |
|---|---|---|---|
| 378621 | 6/1921 | Fed. Rep. of Germany | 261/112 |
| 638830 | 12/1978 | U.S.S.R. | 261/112 |

Primary Examiner—Tim Miles
Attorney, Agent, or Firm—L. Lawton Rogers, III

[57] ABSTRACT

In an apparatus for cooling of cooling water trickler plates are arranged essentially in parallel. Along one side of each trickler plate water sprayed from the top trickles down, while the other side is kept dry. Thus a pair of adjacent trickler plates each forms a duct through which the cooling air flows. The trickler plates are provided with depressions in the wet side protruding from the dry side in order to increase the dry cooling effect with respect to the wet cooling effect.

26 Claims, 11 Drawing Figures

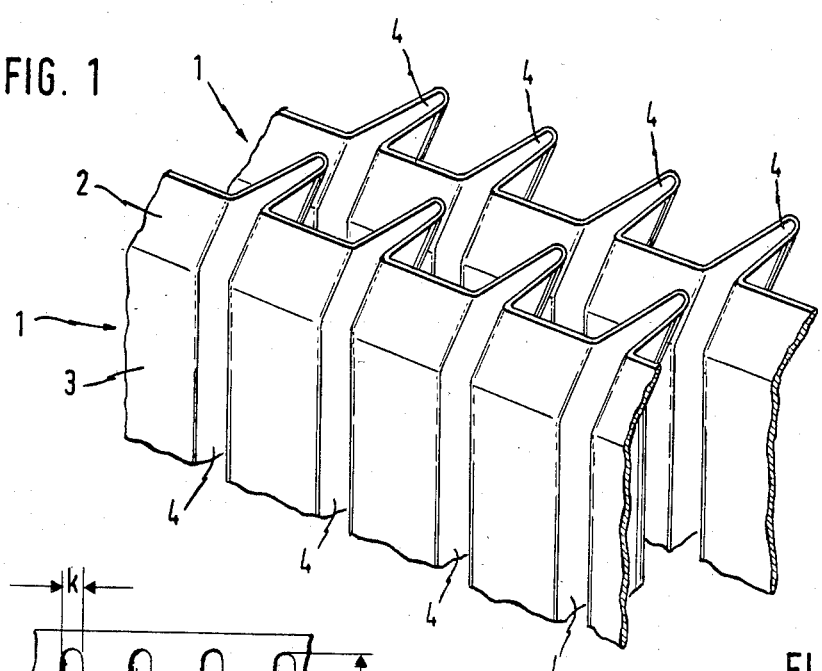
FIG. 1
FIG. 2
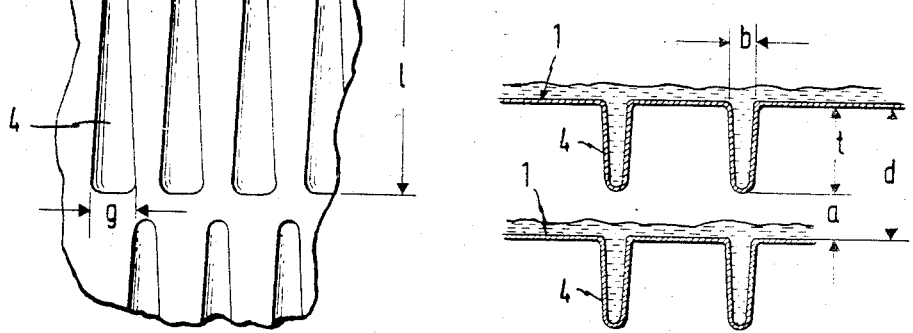
FIG. 3
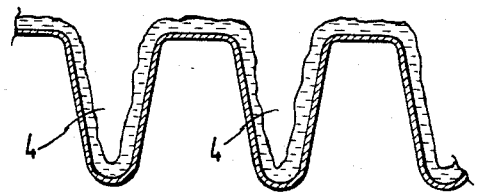
FIG. 4
FIG. 5
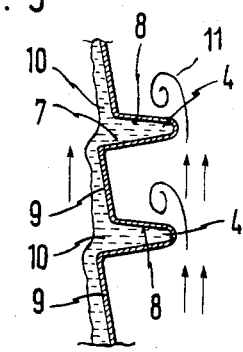

APPARATUS FOR COOLING COOLING WATER

This is a continuation of application Ser. No. 216,496 filed Dec. 15, 1980, now abandoned.

The instant invention relates to an apparatus for cooling cooling water, in particular in cooling towers, comprising trickler plates essentially arranged in parallel, along one side of each of which—the wet side—water sprayed from the top trickles down, while the other side—the dry side—is kept dry, two adjacent trickler plates each forming ducts through which the cooling air flows.

In connection with a known apparatus of this kind it was proposed, among others, that the trickler plates should be provided with protrusions sticking out of the wet side (U.S. Pat. No. 4,202,847, FIG. 6). These protrusions are to reduce the wet surface area because the water flowing down between them leaves the protrusions partly dry. However, this measure is not very effective because it also results in a reduction of the heat transfer to the dry side.

It is already known (DE-AS No. 22 50 912) to provide trickler plates assembled in honeycomb-like blocks with depressions or grooves destined to avoid the collection of the so-called "gusset liquid" in the gussets of the honeycomb-like blocks.

It is likewise known to provide trickler plates for socalled wet cooling towers, in which both sides of the trickler plates are wetted, with reinforcements to improve the stability of the trickler plate arrangement in the interior built-in units of the cooling tower.

It is the object of the instant invention to increase the proportion of the dry cooling portion with respect to the wet cooling portion in an apparatus of the kind defined initially.

This object is met, in accordance with the invention, in that the trickler plates are provided with depressions in the wet side protruding from the dry side.

The depressions on the wet side are also covered by the water layer flowing down. The depressions may be so narrow that a continuous water film is formed on the wet side so that the depressions become totally filled with water. Thus the wet cooling surface area is reduced by the surface area of the depressions with respect to the dry side from which the depressions protrude, increasing the overall surface area of the dry side.

However, if the depressions are not so narrow that a continuous water film will "close" them, part of the air in the depressions will be prevented by friction from flowing upwards, particularly so if the counterflow system is employed with which the air is flowing upwardly against the water trickling down. Thus the total rate of flow of air at the wet side is reduced, resulting in a corresponding reduction of the proportion of the wet cooling, as compared with the cooling at the dry side.

Preferably, the depressions may be provided in the form of grooves.

The grooves preferably are arranged in parallel and have a length between 30 and 300 mm. The length of the grooves is limited in the manner indicated because otherwise the water would become too cool if the grooves were too long. This in turn would make the grooves cooler than the remaining surface area of the wet side, thereby detracting from the desired effect. The limitation of the groove length and/or the provision of several groups of grooves, one above the other with lateral offsetting in each trickler plate provides that always fresh water will flow into always new grooves whereby an intensive heat exchange is obtained through the groove wall.

It is advantageous to have the grooves flare or diverge downwardly such that the greatest groove width at the lower end is in the order of one and a half times the smallest groove width at the upper end. In side elevation the groove then has the preferred shape of a club. This configuration helps to prevent clogging of the groove.

To obtain the total filling of the depressions or grooves at the wet side with water, the groove width conveniently is selected in a range between 1 and 5 mm, preferably at 2 mm. Then complete filling is achieved by the capillary action of the water. The wet cooling is reduced in correspondence with the surface area inside the depression no longer taking part in the substance and heat exchange between air and water at the wet cooling side, and the dry cooling proportion is increased accordingly.

The groove depth conveniently is so selected that it lies between 10 and 40 mm, with an arrangement of the grooves in parallel with the flow of air, and that it is in the order of up to 5 mm if the grooves extend transversely of the flow of air. The distance from the adjacent plate may be up to twice as great as the depth mentioned. However, the distance between the apices or bottoms of the depressions and the adjacent trickler plate at least should correspond to the usual water film thickness so that the film of water can flow down at the wet side without being disturbed.

The distance mentioned should be much greater than the groove depth in those cases in which the grooves protrude from the dry side transversely of the flow of air. The reason is that with such an arrangement of the grooves, turbulences are created which, although favoring the intensive dry cooling at the dry side, should be kept away from the wet side so as to diminish the wet cooling effect.

The grooves also may be disposed horizontally. In this event it is preferred if the lower sidewalls of the horizontal grooves project with respect to the upper sidewalls thereof so as to form collecting surfaces for water trickling down from above. This makes it necessary for the intermediate faces which may be planar, for instance, between the lower sidewalls and the upper sidewalls to overhang.

Grooves which are offset laterally with respect to one another and groups of grooves disposed one above the other may also be interconnected.

In this context, a particularly preferred embodiment of the grooves is an arrangement in a honeycomb pattern. The groove depth in this arrangement, on the whole, is less than with grooves disposed in the direction of the flow of air, and lies in the order of 5 mm, for example.

The depressions or grooves in accordance with the invention all may be directed to the same side so that each dry side from which the depressions protrude is facing the planar wet side of the adjacent trickler plate. In this case each flow duct formed between two adjacent trickler plates is limited by one dry wall and one wet wall.

When applying the cross-flow principle, however, it may be favorable for obtaining simple trickling, if the wet sides each and the dry sides each of the trickler plates face each other, respectively, This permits a construction of the trickler plates in pairs in the form of inverted U-shaped profiles, with their closed ends facing in upward direction and the legs of the U disposed vertically. The sides of the legs at the inside of the U-profile are dry and the outer sides are wet, as is known per se.

In an arrangement in which all the ducts formed between the trickler plates are open at the top, of course, known measures may be applied for wetting only one side of the trickler plates, such as inclining the uppermost portion of the trickler plate and positioning the adjacent trickler plates at a suitable distance so that, upon spraying vertically from above, one side only of the respective trickler plate becomes wet. It is further conceivable to provide combs with dripping noses above the trickler plates, the dripping noses being aligned vertically with the uppermost grooves of the trickler plates disposed below them.

The instant invention is not limited to the groove configuration. In principle, depressions of irregular shape and depth may be provided in each trickler plate.

The invention will be described below, by way of example, with reference to diagrammatic drawings, in which:

FIG. 1 is a perspective view of a trickler plate arrangement showing only a section of the upper ends of two parallel trickler plates formed with grooves which extend substantially vertically;

FIG. 2 is a horizontal sectional elevation of the trickler plate arrangement according to FIG. 1;

FIG. 3 is a side elevational view of a trickler plate having groups of vertical grooves disposed one above the other;

FIG. 4 is a part sectional elevation of a trickler plate having wider grooves than the preceding embodiments;

FIG. 5 is a vertical sectional elevation of a trickler plate having horizontal grooves with lower sidewalls projecting beyond the upper sidewalls;

Figure 6:
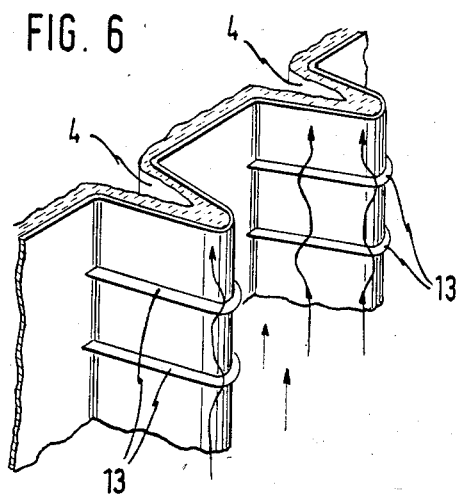
FIGS. 6 and 7 are perspective partial views of trickler plates having grooves provided at their dry sides with fins to produce turbulences.

The trickler plate arrangement according to FIG. 1 comprises a plurality of trickler plates 1 of which two are shown in FIG. 1. The trickler plates are inclined with respect to the vertical in their upper portion 2 so as to effect one-sided wetting of the front side only, as seen in FIG. 1, namely the wet side by water trickling down in vertical direction from above. In the lower portion 3 the trickler plates extend vertically. Of course, an arrangement is conceivable with which the trickler plates are disposed obliquely so that they have an inclination like portion 2 throughout their entire height or width. Conveniently the arrangement of the plates (inclination and spacing) is such that only one side each of the plates will be wetted and no water falls unused between the plates. This has been described in greater detail, for instance, in U.S. Pat. No. 4,202,847. The trickler plates are provided with grooves 4 extending in vertical direction and being depressed in regular spacings out of the wet side towards the dry side.

The sectional view according to FIG. 2 shows the arrangement, in particular the dimensions. It is assumed with this embodiment that the flow of air is contrary to that of the water trickling down, i.e. that the air flows in upward direction along the grooves 4.

The grooves 4 which diverge towards their apex have a mean free groove width between 1 and 5 mm, preferably 2 mm. Such a groove width guarantees that water flowing down the trickler plates at the wet side, as indicated in FIG. 2, completely fills the grooves 4. Consequently the inner walls of the grooves cannot be drawn upon to contribute to the heat exchange between the water and the air flowing in counter-current. The outer walls of the grooves, on the other hand, enlarge the dry side by their additional surface area, this being the respective lower side of the trickler plate 1 shown in FIG. 2.

FIG. 2 discloses further important dimensions of the grooves 4. For instance, these grooves should have a distance a from the opposed trickler plate to permit the undisturbed flow of the water in the usual film thickness, in practice this distance a amounting at least to 5 mm. The groove depth t in practice conveniently lies between 10 and 40 mm. The distance a in practice conveniently lies between 5 and 20 mm. These two dimensions determine the overall spacing d between two adjacent trickler plates.

It will be noted that trickling along the trickler plate arrangement may also be effected in such manner that the amount of water sprayed on to the plates is just sufficient to fill the grooves 4. In this event the wet cooling portion is reduced even much more in favor of the dry cooling portion.

The embodiment illustrated in FIG. 3 makes it clear that the grooves which again are designated by reference numeral 4 for the sake of simplicity, conveniently may have a limited length 1 in the order of between 50 and 300 mm. If one takes into consideration that in practice the trickler plates of great cooling towers can have widths between 0.5 and 2 mm, it becomes clear that then conveniently a plurality of groups of grooves are provided one above the other in each trickler plate. As FIG. 3 shows, these groups conveniently are arranged so as to be laterally offset with respect to one another. The result of this disposition is that also water flowing down between the uppermost grooves 4, as shown in FIG. 3, will reach grooves 4 disposed below the same so that always new water will flow into the grooves when passing the trickler plates. Hereby the groove arrangement causes an intensive cooling of a great proportion of the water, an advantage in respect of the total cooling effect obtainable.

FIG. 3 further clearly shows that the individual grooves 4 conveniently have a downwardly flaring shape, like a club. This enlargement towards the bottom is favorable in that it helps prevent the grooves 4 from becoming plugged by deposits which are unavoidable and in that the water can flow in strong currents through the entire length of the grooves. A convenient ratio between the smallest groove width k at the upper inlet end and the greatest groove width g at the lower outlet end of each groove lies in the order of 1.5.

The embodiment according to FIG. 4 shows grooves 4 of such a width that they can no longer be filled in operation with water because of the capillary action of the same. In normal operation, therefore, these grooves will contain air. However, movement of this air is obstructed by the water trickling down and, in the extreme case, the air flow even comes to a stop or the air is caused to flow in the opposite direction. Thus the amount of air flowing in the grooves is prevented from an effective substance and heat exchange so that in this case again the wet cooling portion is reduced and the dry cooling portion is increased.

In the case of the embodiment shown in FIG. 5 the grooves 4 are disposed horizontally and their width may be small as shown in FIG. 2 or greater, as shown in FIG. 4. The lower side walls 7 project beyond the upper side walls 8 of the grooves and the lower and upper sidewalls 7, 8 are connected with each other by a respective overhanging wall section 9.

With this arrangement a swell of water 10 is formed which impinges on the protruding lower wall 9 and blocks the groove portions behind the same from the air flowing out. In this manner a deterioration of the wet cooling effect and an improvement of the dry cooling effect is achieved by virtue of the surface area enlarged by the grooves at the dry side (at the right side in FIG. 5). This effect is enhanced still further by the fact that the air produces bodies or spots of turbulences 11 behind the grooves at the dry side. However, this generation of turbulences should not be so strong that the turbulence bodies reach the opposed wet side of the consecutive plate so as not to improve the wet cooling effect there. For this reason, the embodiment according to FIG. 5 shows the groove depths limited, for instance to approximately ¼ of the overall spacing d between adjacent trickler plates, i.e. to approximately 5 mm when d=20 mm.

Figure 7:
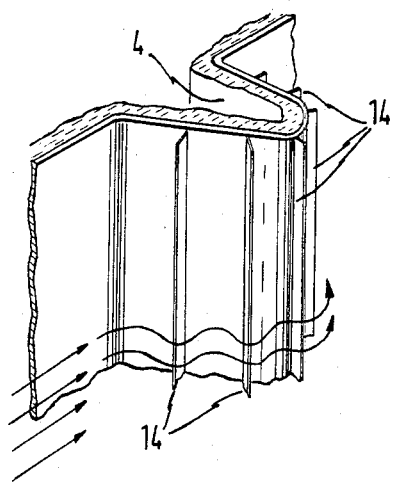

The embodiments according to FIGS. 6 and 7 show fins 13 and 14, respectively, disposed at the outer sides of the grooves which do not necessarily have to extend vertically. The fins extend transversely of the direction of flow of the air at the dry side so as to generate turbulences in the area close to the wall at the dry side.

The embodiment shown in FIG. 6, with which the air flows in longitudinal direction of the grooves 4, has the fins 13 disposed transversely at the outer sides of the grooves 4, whereas the embodiment according to FIG. 7 with which the air flows transversely of the longitudinal direction of the grooves 4 comprises fins 14 extending in longitudinal direction of the grooves at the outer sides of the same.

Figure 8:
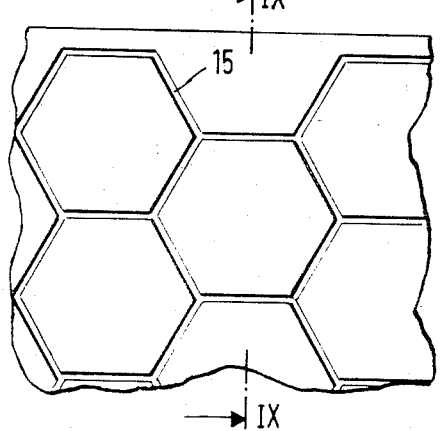
FIG. 8 is a partial view of a trickler plate with a honeycomb arrangement of the grooves.
Figure 9:
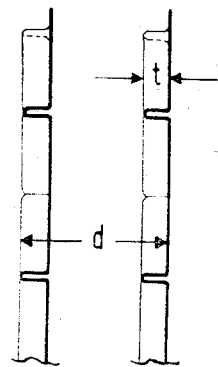
FIG. 9 is a part sectional elevation of two adjacent trickler plates along line IX—IX in FIG. 8.

The trickler plate shown in FIGS. 8 and 9 includes an arrangement of hexagonal honeycombs 15 interconnected in the manner of a honeycomb pattern. The grooves of these honeycombs 15 have a relatively small depth t, down to t=d/4 in comparison with the overall spacing d between two adjacent trickler plates. The purpose of this measure is to keep the turbulences formed at the dry side (in FIG. 9 the left side each of the two plates shown) away from the wet side (in FIG. 9 the right side each of the two plates shown). The honeycomb arrangement according to FIGS. 8 and 9 is especially favorable with a view to having all of the water take part in the flow through the grooves.

Figure 10:
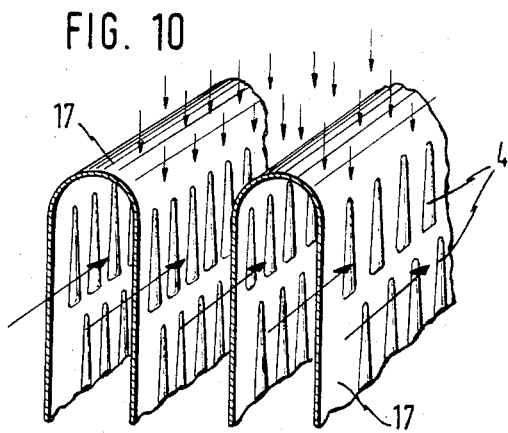
FIG. 10 is a perspective partial view of a trickler plate embodiment according to the invention for application of the cross-flow principle with particularly simple trickling.

The embodiment according to FIG. 10 comprises two trickler plate arrangements 17, each having the configuration of an inverted U (as seen in cross section). Grooves 4 formed in these plates so as to be open at the outer sides of the U-shaped configuration and consequently protruding towards the inner sides thereof may have the shape of the grooves shown in FIG. 3 and be arranged in laterally offset groups disposed one above the other. When trickling is effected from above, the opposed outer sides of the two U-shaped trickler plate arrangements 17 will become wetted, whereas the inner sides will remain dry. Consequently, air directed in cross flow through the plate arrangements has an increased dry cooling effect at the inside of each U-shaped trickler plate arrangement 17, whereas the wet cooling effect at the outer sides of the two U-shaped trickler plate arrangements is reduced because of the depressed grooves 4 through which water is rinsed.

Figure 11:
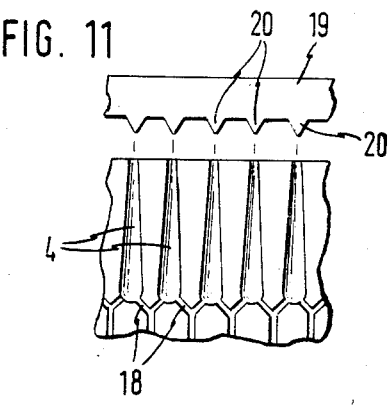
FIG. 11 is a partial view of a spraying means for a trickler plate in accordance with the invention.

The embodiment according to FIG. 11 shows a comb 19 having dripping noses 20 disposed above an arrangement of a trickler plate provided with grooves similar to those shown in FIG. 3 which, however, are connected with the grooves of the respective lower group by inclined passages 18. The dripping noses are vertically aligned with the grooves 4 of the upper-most group so that the water is introduced well into these grooves.

The trickler plates described may be made of sheet metal. However, as their structure is reinforced by the grooves, they may also be made of a lighter material, such as plastics which, moreover, has greater resistance to corrosion than the sheet metal which is normally used. Also, a plastic material is particularly well suited for manufacturing the trickler plates described because it should be less expensive to mold the grooves in plastic material than the corresponding formation of grooves in sheet metal.

Obviously, embodiments which do not have the grooves arranged in parallel or with which the grooves are replaced by depressions of different configuration, e.g. in which they have cone or pyramid shape also are within the limits of the instant invention. In principle, also depressions of any irregular shape can produce the desired effect. At any rate, however, the shape of the depressions should be such that water can flow over their inner walls.

What we claim is:

1. In an apparatus for the cooling of cooling water comprising substantially vertical trickler plates arranged essentially in parallel, one side of each trickler plate being essentially wet and the other side of each trickler plate being essentially dry, and two immediately adjacent trickler plates being spaced from each other to form ducts through which cooling air flows, the improvement wherein the trickler plates are provided with a plurlity of depressions in the wet side thereof protruding from the dry side thereof over an area including substantially the vertical height thereof, said depressions being arranged and dimensioned such that (a) the effective contact area for heat exchange between (1) the cooling air flow and (2) the dry side of each of said trickler plates is greater than (b) the effective contact area for heat exchange between (1) the cooling air flow and (2) the wet side of each of said trickler plates.

2. The apparatus of claim 1 wherein said depressions are formed as generally vertical grooves.

3. The apparatus of claim 2 wherein said generally vertical grooves are substantially parallel and have a length between about 30 mm and about 300 mm.

4. The apparatus of claim 3 wherein said generally vertical grooves are arranged in generally horizontal rows, with said depressions in adjacent rows being laterally offset a distance about one half the distance between adjacent grooves in a row.

5. The apparatus of claim 4 wherein the apices of said generally vertical grooves are spaced from the essentially wet side of the adjacent one of said trickler plates by a distance at least as great as the thickness of the film of water flowed over the essentially wet side of said adjacent one of said trickler plates.

6. The apparatus of claim 5 wherein said generally vertical grooves converge toward the apex thereof and wherein the mean free groove width thereof is between about 1 mm and 5 mm.

7. The apparatus of claim 6 wherein the depth of said generally vertical grooves is between about 5 mm and about 50 mm.

8. The apparatus of claim 7 wherein said generally vertical grooves extend in a zig-zag shape.

9. The apparatus of claim 8 wherein the essentially dry side of said trickler plates are provided with fins transverse to the flow of air for disturbing the flow of air in said ducts.

10. The apparatus of claim 1 wherein said depressions are arranged and dimensioned such that they substantially fill with water when the water to be cooled is flowed over said essentially wet side, thereby reducing (1) the effective contact area between (a) the cooling air flow and (b) the water to be cooled relative to (2) the effective contact area between (a) the water to be cooled and (b) the surface of the trickler plates on said essentially wet side thereof.

11. The apparatus of claim 10 wherein the eseentially dry side of said trickler plates are provided with fins transverse to the flow of air for disturbing the flow of air in said ducts.

12. The apparatus of claim 1 wherein the essentially dry side of said trickler plates are provided with fins transverse to the flow of air for disturbing the flow of air in said ducts.

13. The apparatus of claim 1 wherein said depressions are formed as generally horizontal grooves.

14. The apparatus of claim 13 wherein the lower sidewalls of said generally horizontal grooves project beyond the upper sidewalls thereof to form collecting surfaces for water to be cooled when flowed down the essentially wet side of said trickler plates.

15. The apparatus of claim 1 wherein the flow of air is approximately normal to the flow of water and wherein the adjacent sides of adjacent ones of said trickler plates are both wet or both dry.

16. The apparatus of claim 1 wherein said depressions are generally vertical and have a width at the lower end thereof approximately 150 percent of the width of said depressions at the upper end thereof.

17. The apparatus of claim 16 wherein said generally vertical depressions are disposed in generally horizontal rows with depressions of adjacent rows offset from the depressions of the immediately adjacent row about one half of the distance between depressions in a horizontal row.

18. The apparatus of claim 1 wherein the apices of said depressions are spaced from the essentially wet side of the adjacent one of said trickler plates by a distance greater than the thickness of the film of water flowed over the essentially wet side thereof.

19. The apparatus of claim 1 wherein said depressions converge toward the apex thereof and wherein the mean free width thereof is between about 1 mm and 5 mm.

20. The apparatus of claim 1 wherein said depressions form a honeycomb pattern.

21. An apparatus for cooling a liquid comprising:
a plurality of trickler plates each configured to provide a first side having a greater effective heat transfer surface area on one side than on the other side thereof over an area including substantially the vertical height thereof;
means for disposing said trickler plates in parallel to form a duct therebetween;
means for flowing a film of the liquid to be cooled over said other side of each of said trickler plates; and
means for passing a cooling gas through said duct in contact with said one side of the trickler plate forming the duct and in contact with the liquid flowing down the other trickler plate forming the duct.

22. The apparatus of claim 21 wherein each of said plurality of trickler plates is configured to include a plurality of spaced depressions, the distance between sidewalls of said depressions on said other side being such that said depressions fill with the liquid to be cooled when the liquid is flowed thereon by said liquid film flowing means.

23. The apparatus of claim 21 wherein the configuration of each of said trickler plates includes a plurality of fins disposed generally normal to the flow of the cooling gas on said one side thereof.

24. The apparatus of claim 21 wherein the configuration of each of said trickler plates includes a plurality of generally parallel grooves each having a length between about 30 mm and about 300 mm and a depth between about 5 mm and about 50 mm.

25. The apparatus of claim 21 wherein the configuration of each of said trickler plates includes a plurality of spaced generally vertical depressions having a width at the lower end thereof about 150 percent of the width at the upper end thereof.

26. An apparatus for cooling a liquid comprising:
a plurality of trickler plates;
means for disposing said trickler plates in parallel to form ducts therebetween;
means for flowing a film of the liquid to be cooled over only one side of each of said trickler plates and for maintaining the other side of each of said trickler plates dry;
each of said trickler plates being configured over a substantial portion of the height thereof to provide a plurality of depressions adapted to be substantially filled with the liquid when flowed down said one side thereof to thereby reduce the effective heat transfer surface area on said one side thereof; and
means for passing a cooling gas through said duct in contact with said other side of each of said trickler plates forming said ducts and essentially out of contact with said one side of each of said trickler plates forming said ducts, said cooling gas being in contact with the liquid flowing down said one side of each of said trickler plates.

* * * * *